United States Patent
D'Souza et al.

(10) Patent No.: US 9,250,056 B2
(45) Date of Patent: Feb. 2, 2016

(54) SYSTEM AND METHOD FOR MONITORING HEALTH OF AIRFOILS

(71) Applicant: General Electric Company, Schenectady, NY (US)

(72) Inventors: Prashanth D'Souza, Bangalore (IN); Vivek Venugopal Badami, Schenectady, NY (US); Rahul Srinivas Prabhu, Bangalore (IN); Mahalakshmi Shunmugam Balasubramaniam, Bangalore (IN); Ajay Kumar Behera, Bangalore (IN); Aninda Bhattacharya, Bangalore (IN); Venkatesh Rajagopalan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 499 days.

(21) Appl. No.: 13/731,596

(22) Filed: Dec. 31, 2012

(65) Prior Publication Data

US 2014/0188430 A1     Jul. 3, 2014

(51) Int. Cl.
| | |
|---|---|
| *G01B 7/14* | (2006.01) |
| *F01D 21/00* | (2006.01) |
| *G01B 7/02* | (2006.01) |
| *G01B 21/06* | (2006.01) |
| *G01B 11/10* | (2006.01) |
| *G01B 3/12* | (2006.01) |

(52) U.S. Cl.
CPC ............... *G01B 7/14* (2013.01); *F01D 21/003* (2013.01); *G01B 3/12* (2013.01); *G01B 7/02* (2013.01); *G01B 11/10* (2013.01); *G01B 21/06* (2013.01)

(58) Field of Classification Search
CPC ............ G01B 7/14; G01B 3/12; G01B 21/06; G01B 11/10; F01D 21/003
USPC .................................................. 702/158, 163
See application file for complete search history.

(56) References Cited

U.S. PATENT DOCUMENTS

| | | | | |
|---|---|---|---|---|
| 4,724,322 | A | * | 2/1988 | Knowles et al. ........... 250/341.4 |
| 4,874,290 | A | | 10/1989 | Cang et al. |
| 5,101,165 | A | | 3/1992 | Rickards |
| 5,667,358 | A | | 9/1997 | Gaul |
| 6,949,922 | B2 | | 9/2005 | Twerdochlib et al. |
| 7,215,129 | B1 | * | 5/2007 | Andarawis ............ F01D 21/003 324/661 |
| 7,407,369 | B2 | | 8/2008 | Schwarz et al. |
| 8,172,521 | B2 | | 5/2012 | Tillery et al. |
| 8,177,474 | B2 | * | 5/2012 | Andarawis et al. ............... 415/1 |
| 8,229,646 | B2 | * | 7/2012 | Kulczyk ................. G01P 3/481 324/137 |
| 2009/0044542 | A1 | | 2/2009 | Thatcher et al. |

(Continued)

OTHER PUBLICATIONS

Mossop and Gill, "The Measurement of Blade-Tip Clearances in Aircraft Turbines by a Capacitance Method", Proceedings of the IEE—Part II: Power Engineering, Issue Date : Aug. 1953, pp. 377-384.

*Primary Examiner* — John Breene
*Assistant Examiner* — Lynda Dinh
(74) *Attorney, Agent, or Firm* — Ann M. Agosti

(57) ABSTRACT

A method is presented. The method includes the steps of generating rotation signals corresponding to a plurality of rotations of a rotor physically coupled to a plurality of blades, and determining peak voltages corresponding to the plurality of blades by applying time synchronous averaging technique to blade passing signals using the rotation signals, wherein the peak voltages are representative of clearances of the plurality of blades.

11 Claims, 7 Drawing Sheets

(56) References Cited

U.S. PATENT DOCUMENTS

| | | | |
|---|---|---|---|
| 2009/0097968 A1 | 4/2009 | Ballard, Jr. et al. | |
| 2009/0281766 A1* | 11/2009 | Chan | G01B 7/14 702/158 |
| 2009/0301055 A1* | 12/2009 | Kallappa | 60/39.091 |
| 2010/0097079 A1* | 4/2010 | Sheikman | G01B 7/14 324/686 |
| 2010/0268509 A1* | 10/2010 | Zielinski | F01D 11/20 702/158 |

* cited by examiner

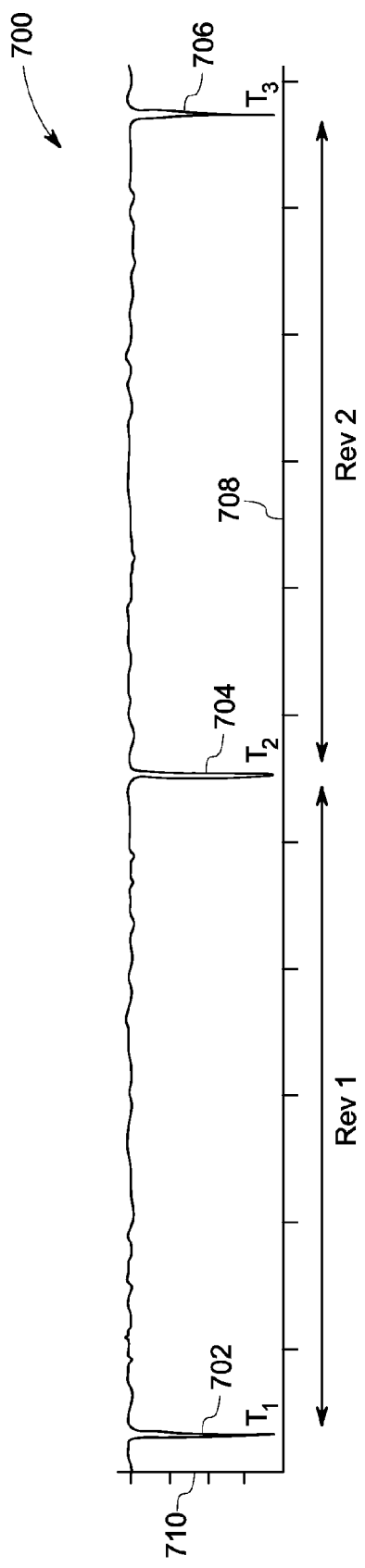
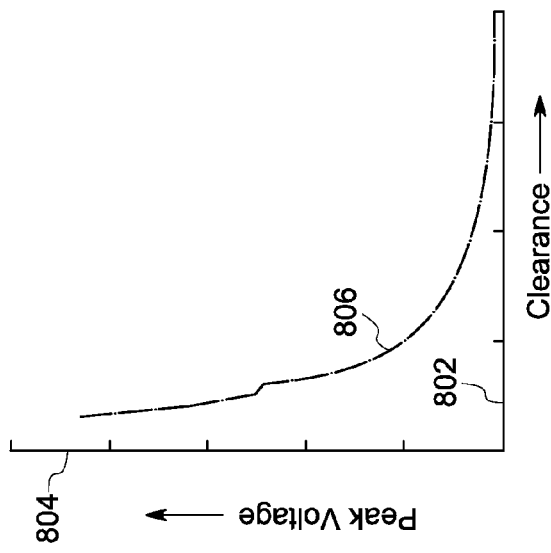
FIG. 7
FIG. 8

SYSTEM AND METHOD FOR MONITORING HEALTH OF AIRFOILS

BACKGROUND

Embodiments of the disclosure relates generally to systems and methods for monitoring health of rotor blades or airfoils.

Rotor blades or airfoils play a crucial role in many devices with several examples including axial compressors, turbines, engines, turbo-machines, or the like. For example, an axial compressor has a series of stages with each stage comprising a row of rotor blades or airfoils followed by a row of static blades or static airfoils. Accordingly, each stage comprises a pair of rotor blades or airfoils and static airfoils. Typically, the rotor blades or airfoils increase the kinetic energy of a fluid that enters the axial compressor through an inlet. Furthermore, the static blades or static airfoils generally convert the increased kinetic energy of the fluid into static pressure through diffusion. Accordingly, the rotor blades or airfoils and static airfoils increase the pressure of the fluid.

Furthermore, the axial compressors that include the rotor blades or airfoils and the static airfoils have wide and varied applications. Axial compressors, for example, may be used in a number of devices, such as, land based gas turbines, jet engines, high speed ship engines, small scale power stations, or the like. In addition, the axial compressors may have other applications, such as, large volume air separation plants, blast furnace air, fluid catalytic cracking air, propane dehydrogenation, or the like.

The airfoils operate for long hours under extreme and varied operating conditions such as, high speed, pressure and temperature that affect the health of the airfoils. In addition to the extreme and varied operating conditions, certain other factors lead to fatigue and stress of the airfoils. The factors, for example, may include inertial forces including centrifugal force, pressure, resonant frequencies of the airfoils, vibrations in the airfoils, vibratory stresses, temperature stresses, reseating of the airfoils, load of the gas or other fluid, or the like. A prolonged increase in stress and fatigue over a period of time leads to defects and cracks in the airfoils. One or more of the cracks may widen with time and result in liberation of an airfoil or a portion of the airfoil. The liberation of airfoil may be hazardous for the device that includes the airfoils, and thus may lead to enormous monetary losses. In addition, it may be unsafe for people located near the device.

Accordingly, it is highly desirable to develop a system and method that may predict health of airfoils in real time. More particularly, it is desirable to develop a system and method that may detect and predict cracks or fractures in real time.

BRIEF DESCRIPTION

These and other drawbacks associated with such conventional approaches are addressed here by providing a method in accordance with various embodiments. The method includes generating rotation signals corresponding to a plurality of rotations of a rotor physically coupled to a plurality of blades, and determining peak voltages corresponding to the plurality of blades by applying time synchronous averaging technique to blade passing signals using the rotation signals, wherein the peak voltages are representative of clearances of the plurality of blades.

In another embodiment, a system is presented. The system includes a rotation identification device that generates rotation signals corresponding to a rotor physically coupled to a plurality of blades, and a processing subsystem that determines clearances of a plurality of blades by applying a time synchronous averaging technique to blade passing signals using the rotation signals.

DRAWINGS

These and other features, aspects, and advantages of the present invention will become better understood when the following detailed description is read with reference to the accompanying drawings, wherein:

FIG. 7 is an exemplary graphical representation of rotation signals corresponding to a rotor and blades, in accordance with one embodiment of the present techniques; and FIG. 8 is an exemplary calibration curve that shows relationship between peak voltages and clearances corresponding to a plurality of blades, in accordance with aspects of the present techniques.

DETAILED DESCRIPTION

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "clearance" may refer to a distance or spacing between two objects. Typically, turbines include blades that are covered by a casing. The radial distance between the blades and the casing or sensors located on the casing is generally referred to as clearance of the blades. Additionally, the term "clearance" may also be used to refer to radial distances between the tips of the blades and the internal surface of the casing. Clearance may be used for determination of the health of the blades, and prevention of the turbines from damage. For example, an increase in the clearance of a blade A may be due to a bend, a tip loss, or a crack in the blade A. Similarly, a reduction in the clearance of the blade A may be due to reseating of the blade A. Additionally, it is noted that the reduction in the clearance of the blade A may result in crashing of the blade A. The crashing of the blade A may result in cracks in the blade A or other damage to a turbine or a turbine engine that includes the blade A. Therefore, real-time estimation and monitoring of clearance is required. As discussed in detail below, embodiments of the present systems and methods estimate and monitor clearance between two objects, such as, clearance between a turbine blade and a casing, in real-time. Furthermore, embodiments of the present systems and techniques monitor the health of the blades in real-time.

Figure 1:
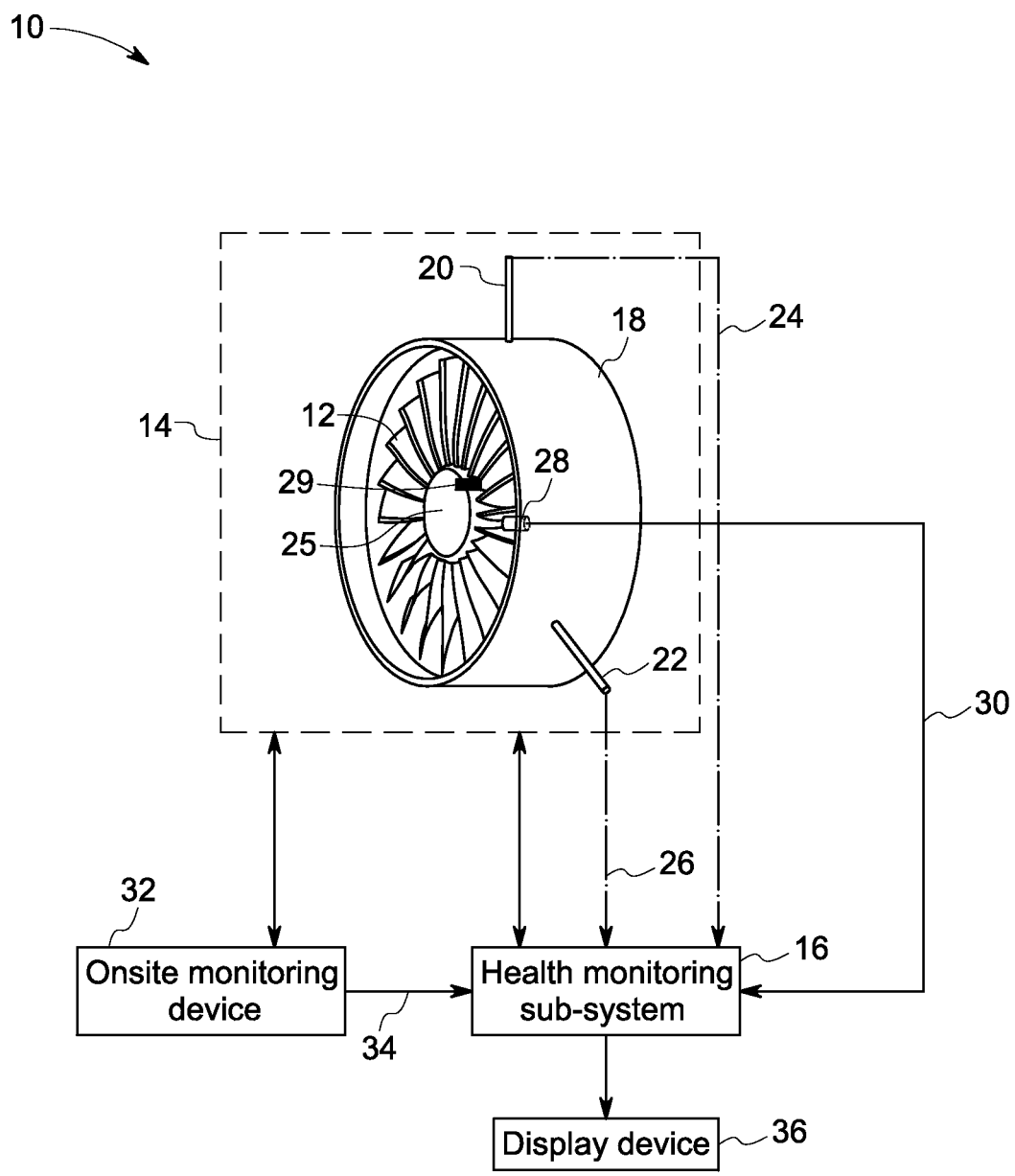
FIG. 1 is a diagrammatic illustration of a system for determination of the health of a plurality of blades, in accordance with an embodiment of the present systems.

As discussed in detail below, embodiments of the present techniques determine clearance between two objects in various systems, such as, a steam turbine, a gas turbine, a turbine, and so forth. FIG. 1 is a diagrammatic illustration of a system 10 for determination of the health of a plurality of blades 12. The system 10 comprises a turbine 14 and a health monitoring sub-system 16. As shown in FIG. 1, the health monitoring sub-system 16 is in an operational communication with the turbine 14. The health monitoring sub-system 16, for example, may be a processing subsystem, a computing device, or the like. In one embodiment, the health monitoring sub-system 16 may be located in vicinity of the turbine 14. In another embodiment, the health monitoring sub-system 16 may be located in a cloud. In still another embodiment, the health monitoring sub-system 16 may be located at a remote location with respect to the location of the device 14.

The turbine 14 includes the blades 12 that are covered by a casing 18. In the illustrated embodiment, the system 10 includes a plurality of sensors 20, 22 that are operationally coupled to the health monitoring sub-system 16. In the presently contemplated configuration, the sensors 20, 22 are capacitive sensors. The sensors 20, 22, for example may be a magnetic sensor, a capacitive sensor, an eddy current sensor, or the like. In operation, the sensors 20, 22 generate blade passing signals (BPS) 24, 26 when a blade in the blades 12 passes proximate the sensors 20, 22. Particularly, the sensor 20 generates the BPS 24, and the sensor 22 generates the BPS 26.

Furthermore, the system 10 includes a rotation identification device 28 that generates rotation signals 30 corresponding to the blades. As used herein the phrase "rotation signals" refers to signals representing completion and/or beginning of a rotation of a rotating object physically coupled to a plurality of blades. In this embodiment, a rotor 25 physically coupled to the blades 12 comprises a notch 29, and the rotation identification device 28 is mounted underneath the casing 18. In operation of one example, when the rotor rotates and the notch passes under the rotation identification device 28 the rotation signals 30 are generated by the rotation identification device 28. Accordingly, in operation, on completion of each rotation of the rotor 25, a rotation signal is generated by the rotation identification device 28. In one embodiment, the rotation identification device 28 is a keyphasor.

The system 10 further includes an onsite monitoring device 32. The onsite monitoring device 32 is in an operational communication with the turbine 14 and the health monitoring sub-system 16. The onsite monitoring device 32 receives data from the turbine 14, and generates operational parameters 34 based upon the received data. The operational parameters 34, for example, include a speed of the turbine 14, a temperature of the turbine 14 at the time of generation of the BPS 24, 26, an inlet guide vane parameter, or the like. Furthermore, the onsite monitoring device 32 transmits the operational parameters 34 to the health monitoring sub-system 16.

Additionally, as shown in FIG. 1, the sensors 20, 22 transmit the blade passing signals (BPS) 24, 26 to the health monitoring sub-system 16. Furthermore, the rotation identification device 28 transmits the rotation signals 30 to the health monitoring sub-system 16. The health monitoring sub-system 16 receives the BPS 24, 26 from the sensors 20, 22 and the rotation signals 30 from the rotation identification device 28. Furthermore, the health monitoring sub-system 16 determines and monitors the health of the blades 12 based upon the BPS 24, 26 and the rotation signals 30, in real-time. In certain embodiments, the health monitoring sub-system 16 determines clearances of the blades 12 based upon the BPS 24, 26 and the rotation signals 30.

Particularly, the health monitoring sub-system 16 determines peak voltages corresponding to the blades 12 based upon the BPS 24, 26 and the rotation signals 30. The health monitoring sub-system 16, for example, determines the peak voltages by applying a time synchronous averaging technique to the BPS 24, 26 using the rotation signals 30. The determination of the clearances of the blades 12 are explained in greater detail with reference to FIG. 2.

Furthermore, in certain embodiments, the health monitoring sub-system 16 generates one or more alarms to indicate defects in the blades 12 or the sensors 20, 22. The health monitoring sub-system 16 generates the alarms based upon the clearances of the blades. As shown in FIG. 1, the system 10 includes a display device 36 that is in an operational communication with the health monitoring sub-system 16. The display device 36, displays the BPS 24, 26, the clearance values, one or more intermediate processes or values, the alarms, or the like.

Figure 2:
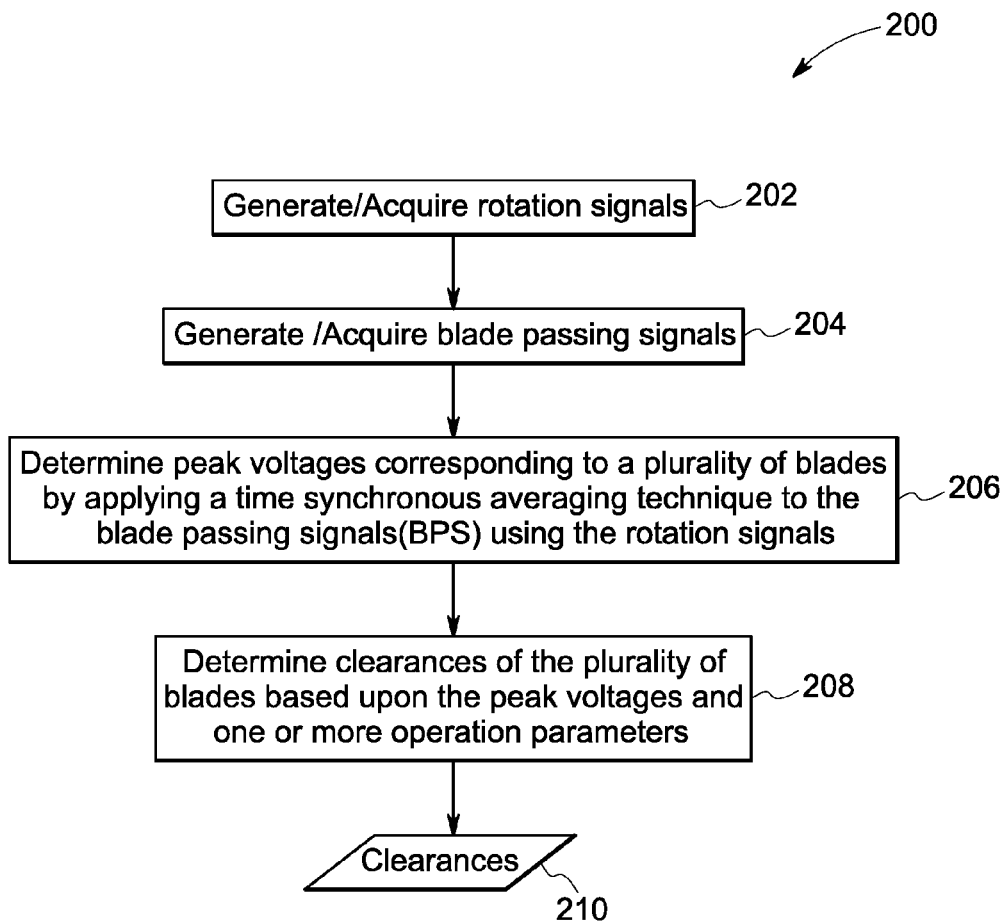
FIG. 2 is a flow chart illustrating an exemplary method for determination of clearance corresponding to a plurality of blades, in accordance with aspects of the present techniques, in accordance with one embodiment of the present techniques.
Figure 6:
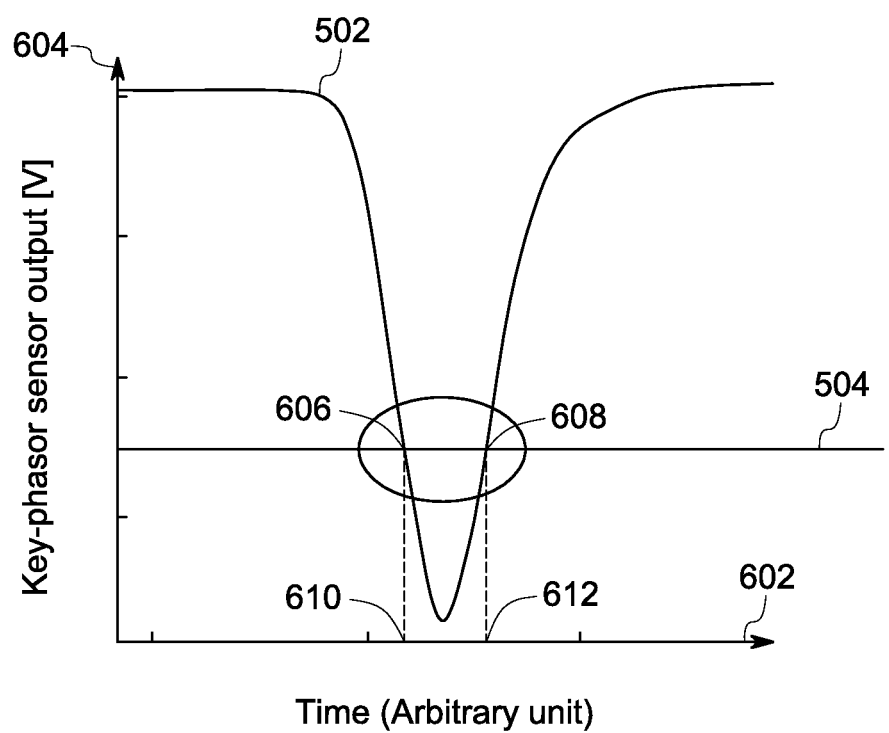
FIG. 6 is a graphical representation of an exemplary rotation signal for determination of times of generation corresponding to the rotation signal, in accordance with aspects of the present techniques.

FIG. 2 is a flow chart 200 illustrating an exemplary method for determination of clearance of blades, in accordance with aspects of the present techniques. At block 202, rotation signals are generated by one or more rotation identification devices. The rotation signals, for example, may be the rotation signals 30. The rotation signals represent completion of rotations of a rotor physically coupled to a plurality of blades. As previously noted, the phrase "rotation signals" refers to signals representing completion and/or beginning of a rotation of a rotating object physically coupled to a plurality of blades. The rotating object, for example, may be the rotor 25 and the plurality of blades may be the blades 12 referred to in FIG. 1. The rotation identification device may be the device 28 referred to in FIG. 1. The rotation identification device, for example, may be a keyphasor. The rotation signals, for example, are similar to the rotation signals 30 referred to in FIG. 1. For ease of understanding, exemplary rotation signals are shown in FIG. 6 and FIG. 7.

Furthermore, at block 204, blade passing signals corresponding to the blades are generated. The blade passing signals, for example, are generated by sensors, such as, the sensors 20, 22 referred to in FIG. 1. The blade passing signals, for example, may be the blade passing signals 24, 26. (see FIG. 1). At block 206, peak voltages corresponding to the blades are determined by applying a time synchronous averaging technique on the rotation signals and the blade passing signals. The determination of the peak voltages is explained in detail with reference to FIG. 3. Furthermore, at block 208, clearances 210 are determined based upon the peak voltages. In certain embodiments, the clearances 210 are determined based upon the peak voltages and operational parameters. In certain embodiments, the clearances, for example, may be determined by one or more sensors or devices that are calibrated to map the peak voltages to corresponding clearances of the blades. An exemplary calibration curve that shows a relationship between peak voltages and clearances is shown in FIG. 8. Referring now to FIG. 8, X-axis 802 is representative of clearances corresponding to a plurality of blades, and Y-axis 804 is representative of peak voltages. A calibration curve 806 shows a relationship between clearances and peak voltages corresponding to the plurality of blades. As may be noted in FIG. 8, the peak voltages are inversely proportional to the clearances of the plurality of blades.

Figure 3:
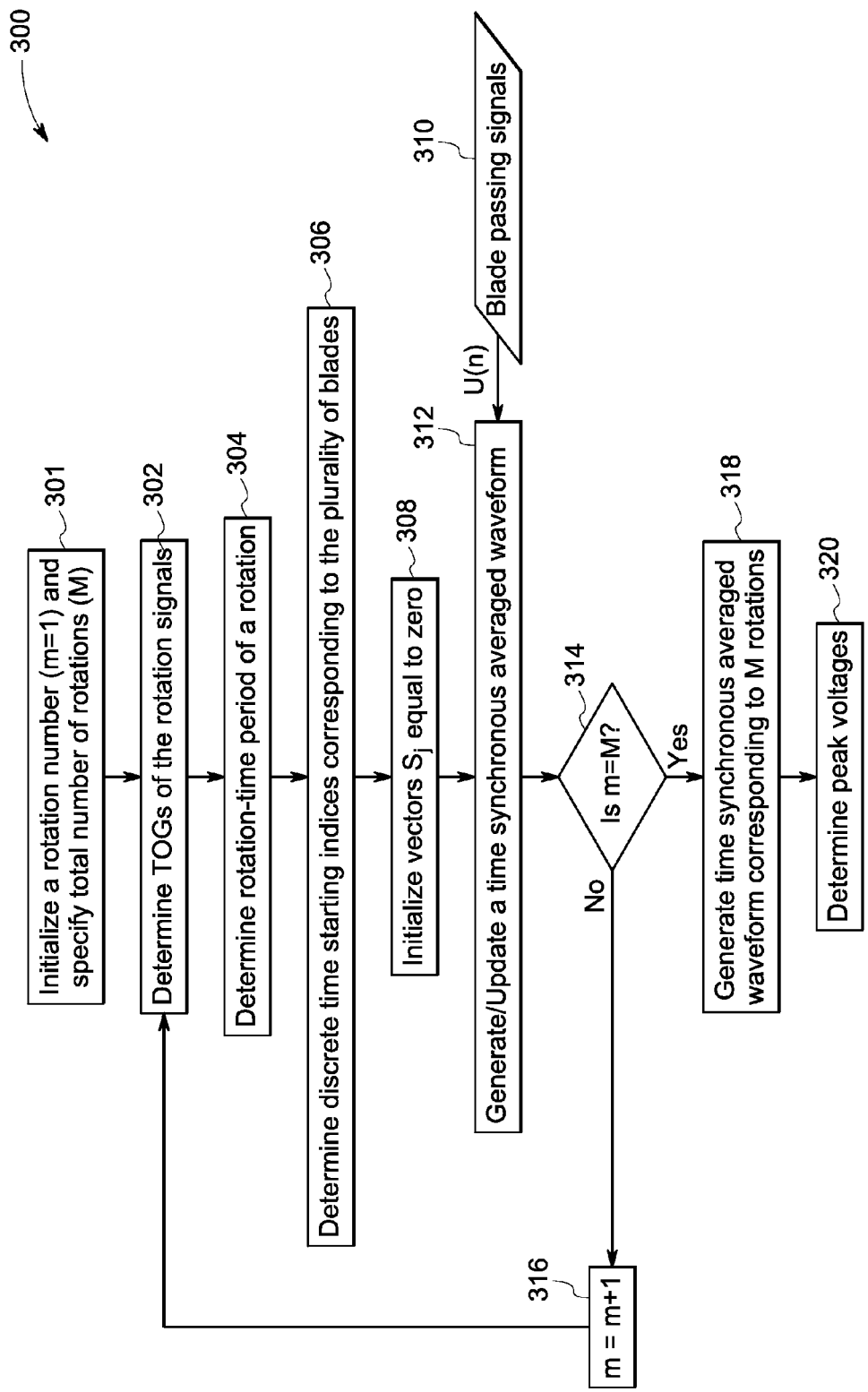
FIG. 3 is a flow chart illustrating an exemplary method for determination of peak voltages corresponding to a plurality of blades physically coupled to a rotor, in accordance with aspects of the present techniques.

Referring now to FIG. 3, a flow chart illustrating an exemplary method 300 for determination of peak voltages of a plurality of blades physically coupled to a rotor, in accordance with aspects of the present techniques is illustrated. The rotor, for example is the rotor 25, and blades, for example are the blades 12. Particularly, the flowchart 300 explains step 206 in FIG. 2 in greater detail.

At block 301, a rotation number m is initialized equal to 1. Furthermore, at the block 301, a total number of rotations (M) are specified. The total number of rotations (M) defines the limits till when rotation signals and blade passing signals are used for determination of the peak voltages. Accordingly, rotation signals and blade passing signals generated during the M rotations of the rotor and the blades are utilized by the method 300 to determine the peak voltages. The method 300 is iterated M number of times. For ease of understanding, the method 300 will be explained with reference to a single rotation of the rotor and the blades; however, the method 300 is repeated till M number of times specified by a user. It is noted that a higher value of M results in determination of peak voltages with relatively minimum error.

At block 302, times of generation of rotation signals are determined The rotation signals, for example, may be the signals 30. The determination of the times of generation of the rotation signals is explained in detail with reference to FIG. 5. In the first iteration of the method 300 when m is equal to 1, times of generation of rotation signals (R) are determined for a first rotation of the rotor and the blades. In other words times of generation of rotation signals are determined based upon rotation signals (R) that are generated at the beginning of a first rotation, completion of the first rotation and beginning of a second rotation. For ease of understanding, an exemplary graph that shows rotation signals that are generated at the beginning of a first rotation, completion of the first rotation and beginning of a second rotation is shown in FIG. 7.

At block 304, a rotation time period for each blade in an $m^{th}$ rotation is determined The rotation time period $d_m$ for an $m^{th}$ rotation of the blades, for example, is determined using the following equation (1):

$$d_m = \frac{TOG_{m+1} - TOG_m}{N} \quad (1)$$

wherein $TOG_{m+1}$ is a time of generation of a rotation signal generated at the completion of an $(m)^{th}$ rotation and beginning of an $(m+1)^{th}$ rotation. Furthermore, $TOG_m$ is a time of generation of a rotation signal generated at the completion of the $(m-1)^{th}$ rotation and a beginning of a $m^{th}$ rotation, and N is a number of blades. In the first iteration of the method 300, rotation time period for the $1^{st}$ rotation corresponding to the blades is determined based upon a time of generation of a rotation signal generated at the beginning of the first rotation and another rotation signal generated at the completion of the first rotation and beginning of a second rotation.

At block 306, discrete time starting indices corresponding to the plurality of blades is determined Particularly, at block 306, discrete time starting indices corresponding to each of the plurality of blades for a rotation is determined In the first iteration of method 300, the discrete time starting indices corresponding to the blades for the first rotation is determined In other words, in the first iteration of the method 300, the discrete time starting indices corresponding to the blades is determined using the rotation-time period for the first rotation and time of generation of a rotation signal generated at the beginning of the first rotation. Therefore, in an $m^{th}$ iteration of the method 300, the discrete time starting indices corresponding to the blades are determined using the rotation-time period for the $m^{th}$ rotation and a time of generation of a rotation signal generated at the beginning of the $m^{th}$ rotation. In one embodiment, a discrete time starting index corresponding to each of the blades is determined In one embodiment, the discrete time starting indices corresponding to the blades is determined using the following equation (2):

$$k_j(m) = (TOG_m + (j-1))^* d_m \quad (2)$$

wherein $k_{j(m)}$ refers to discrete time starting index corresponding to a blade j for $m^{th}$ rotation, $d_m$ refers to the rotation time period for $m^{th}$ rotation, and j is an identification number of a blade.

Figure 4A:
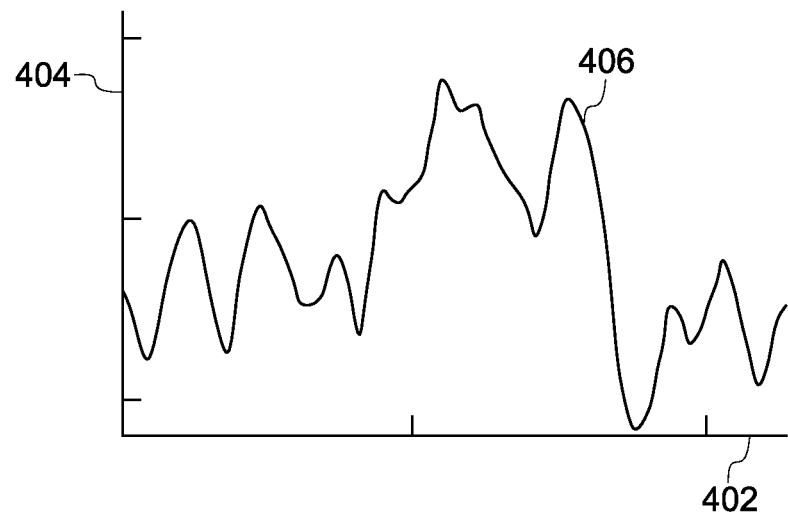
FIG. 4A is a graphical representation of an exemplary blade passing signal corresponding to a blade, in accordance with one embodiment of the present techniques.

At block 308, a vector $S_j$ of a length equal to or the next rounded value of the length of the rotation time period $(d_m)$ is initialized equal to zero. Reference numeral 310 is representative of blade passing signals. The blade passing signals 310, for example, may be similar to the blade passing signals 24, 26 referred to in FIG. 1. An exemplary blade passing signal 406 is shown in FIG. 4A. Referring now to FIG. 4A, X-axis 402 represents time stamps and Y-axis 404 represents voltages. As shown in FIG. 4A, the blade passing signal 406 is noisy.

Referring back to FIG. 3, at block 312, a time synchronous averaged waveform is generated or updated based upon the blade passing signals 310, the discrete time starting indices and the rotation time period. The time synchronous averaged waveform, for example, may be determined using the following equation (3):

$$S_j(m) = S_j(m-1) + U(k_j(m):k_j(m) + d_m - 1) \quad (3)$$

wherein $S_j(m)$ refers to a time synchronous averaging waveform vector till $m^{th}$ rotation, $S_j(m-1)$ refers to a time synchronous averaging waveform vector till $(m-1)^{th}$ rotation, U is a sampled blade passing signal, $k_j(m)$ refers to discrete time starting index corresponding to a blade j for $m^{th}$ rotation, and $d_m$ refers to the mean rotation time period for $m^{th}$ rotation. For example, in the first iteration or for a first rotation, a time synchronous averaging waveform vector for the first rotation is generated based upon blade passing signals 310, the discrete time starting indices and the rotation time period that correspond to the first rotation. Furthermore, in the second iteration or for the second rotation, the time synchronous averaging vector for the first rotation is updated based upon blade passing signals 310, discrete time starting indices and rotation time period that correspond to the second rotation At block 314, a check is carried out to determine whether the value of m is equal to the value of M. In other words, it is determined whether the method 300 has been iterated M number of times as specified by the user at the step 301. Particularly, at block 314, it is determined whether the method 300 is applied to the blade passing signals and the times of generation of the rotation signals generated during the M rotations. At block 314 when it is determined that m is less than M, then the control is transferred to block 316. At block 316, the value of m is increased by 1, and the control is transferred back to 302.

As previously noted, at block 302, times of generation of rotation signals are determined Since the block 302 is iterated for $(m+1)^{th}$ rotation, the times of generation of the rotation signals are determined for the $(m+1)^{th}$ rotation. Particularly, times of generation for the $(m+1)^{th}$ rotation are determined using rotation signals that are generated at the completion of $(m+1)^{th}$ rotation and at the beginning of $m^{th}$ rotation. Subsequent to the execution of the block 302, the blocks 304-312 are executed to update the time synchronous averaging waveform vector $S_j(m)$. Again at block 314 it is determined whether m is equal to M, and when it is determined that m is less than M, the blocks 302 to 314 are iterated to update the time synchronous averaging waveform vector $S_j(m)$.

Figure 4B:
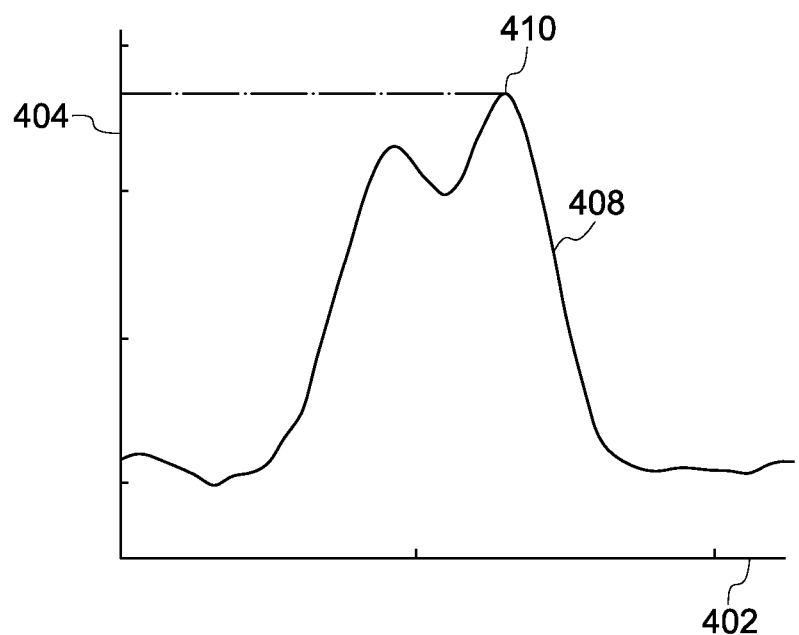
FIG. 4B is a graphical representation of an exemplary time synchronous averaged waveform determined by applying time synchronous averaging technique to the blade passing signal referred to in FIG. 4A, in accordance with one embodiment of the present techniques.

At block 314, when it is determined that m is equal to M, then the control is transferred to block 318. At block 318, determination of a time synchronous averaged waveform is declared. The time synchronous averaged waveform, for example, is the latest updated time synchronous averaging waveform vector $S_j(m)$. An exemplary graphical representation of a time synchronous averaged waveform 408 is shown in FIG. 4B. Referring now to FIGS. 4A and 4B, the time synchronous averaged waveform 408 is generated by applying a time synchronous averaging technique to the blade passing signal 406 using one or more corresponding rotation signals. As evident from the time synchronous averaged waveform 408, the noise in the blade passing signal 406 is substantially reduced by application of a time synchronous averaging technique to generate the time synchronous averaged waveform 408. Referring back to FIG. 3, at block 320, peak voltages corresponding to the blades are determined based upon the time synchronous averaging waveform determined for M rotations. The peak voltages, for example, may be the voltages determined at step 206 in FIG. 2. As shown in FIG. 4B, reference numeral 410 is representative of a peak voltage that is determined based upon the time synchronous averaging waveform 408.

Figure 5:
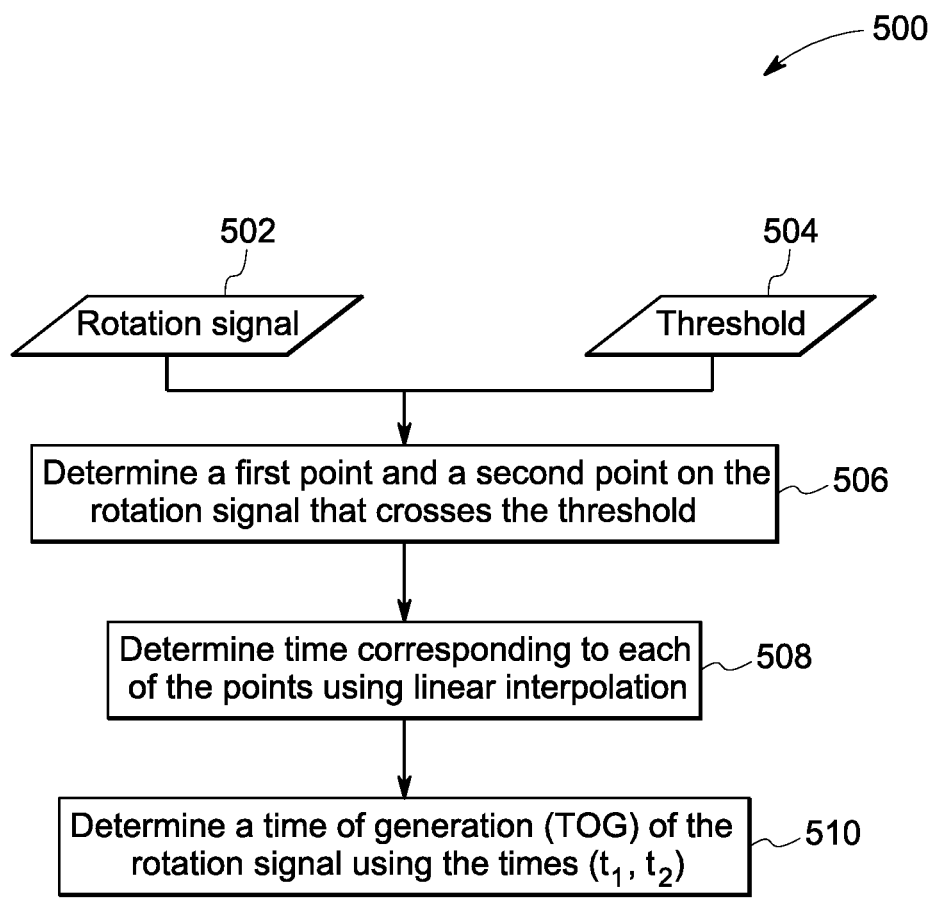
FIG. 5 is a flow chart illustrating an exemplary method for determination of times of generation of rotation signals, in accordance with aspects of the present techniques.

Referring now to FIG. 5, a flow chart 500 illustrating an exemplary method for determination of times of generation of rotation signals, in accordance with aspects of the present techniques is illustrated. Reference numeral 502 is representative of a rotation signal, and reference numeral 504 is representative of a threshold. The rotation signal 502, for example, may be the rotation signal 30. Exemplary rotation signal 502 is shown in FIG. 6. As shown in FIG. 6, X-axis 602 represents time, and Y-axis 604 represents voltage. In this embodiment, the rotation signal 502 is a negative pulse. The threshold 504, referred to in FIG. 5 and shown in FIG. 6, for example, may be a user defined constant, or may depend upon a category of rotation identification device used for generation of the rotation signal 502. In one embodiment, the threshold 504 is a user defined constant.

At block 506, a first point 606 (shown in FIG. 6) and a second point 608 (shown in FIG. 6) on the rotation signal 502 are determined using the rotation signal 502 and the threshold 504. The first point 606 and the second point 608 are the points that are crossed by the rotation signal 502 on the threshold 504. For example, as shown in FIG. 6, the rotation signal 502 crosses the threshold 504 at the first point 606 and the second point 608.

Referring back to FIG. 5, at block 508, a time corresponding to each of the first point 606 and the second point 608 (see FIG. 6) is determined The time corresponding to each of the first point 606 and the second point 608 is determined by a linear interpolation of the first point 606 and the second point 608. As shown in FIG. 6, the first point 606 is linearly interpolated on the X-axis 602 to determine a first time 610, and the second point 608 is linearly interpolated on the X-axis 602 to determine a second time 612. Referring back to FIG. 5, at 510, a time of generation (TOG) of the rotation signal 502 is determined The time of generation of the rotation signal, for example is generated by determining an average of the first time 610 and the second time 612.

Referring now to FIG. 7, an exemplary graphical representation 700 of rotation signals 702, 704, 706 corresponding to a rotor and blades, in accordance with one embodiment of the present techniques, is illustrated. X-axis 708 of the graph represents time stamps, and Y-axis 710 represents voltages. As shown in the graph 700 each of the rotation signals 702, 704, 706 is a negative pulse. Hereinafter, the "rotation signal 702" will be referred to as "first rotation signal," the "rotation signal 704" will be referred to as "second rotation signal," and the "rotation signal 706" will be referred to as "third rotation signal." In this embodiment, the first rotation signal 702 represents starting of a first rotation of the rotor and the blades. Furthermore, the second rotation signal 704 represents completion of the first rotation, and starting of a second rotation of the rotor and the blades. Similarly, the third rotation signal 706 represents completion of the second rotation of the rotor and the blades, and starting of a third rotation of the rotor and the blades.

In one embodiment, when a time of generation (TOG) or a time stamp of the rotation signal 702 is $T_1$, and a time of generation (TOG) or a time stamp of the rotation signal 704 is $T_2$, a time period $(T_2-T_1)$ shows time taken by the rotor or the blades to complete the first rotation. Furthermore, in one embodiment, when a total number of blades are N, then a rotation-time period for each blade in the first rotation is $(T_2-T_1)/N$. Similarly, when a time of generation (TOG) or a time stamp of the third rotation signal 706 is $T_3$, a time period $(T_3-T_2)$ shows time taken by the rotor or the blades to complete the second rotation. Furthermore, in the embodiment, when the total number of blades are N, then a rotation-time period for each blade in the second rotation is $(T_3-T_2)/N$.

Due to high temperatures in turbines, sensors for generating blade passing signals are typically not located in proximity to blades in turbines. Due to the higher distance between the blades and the sensors, and various other factors, such as, high temperature, the blade passing signals generated by such sensors are not precise, and contain unavoidable noise. In accordance with certain embodiments of the present techniques, noise in the blade passing signals is reduced using a time synchronous averaging technique. In accordance with certain other embodiments, the reduction in noise in the blade passing signals using the time synchronous averaged technique results in determination of time synchronous averaging waveforms. The time synchronous averaged waveforms, for example, are used to determine the peak voltages. The peak voltages are used to determine clearances corresponding to blades. The time synchronous averaging technique, for example, may be applied on blade passing signals generated for a determined number of rotations of the blades.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   generating rotation signals, by a rotation identification device, corresponding to a plurality of rotations of a rotor physically coupled to a plurality of blades, wherein the rotation signals represent at least one of a completion and a beginning of a single rotation of the rotor;

determining times of generation of the rotation signals based upon the rotation signals by a processing subsystem;

determining peak voltages corresponding to the plurality of blades by applying time synchronous averaging technique to blade passing signals based on the times of generation of the rotation signals by the processing subsystem;

determining clearances of the plurality of blades based on the peak voltages by the processing subsystem, wherein the clearances are representative of a radial distance between the plurality of blades and a casing; and monitoring health of the plurality of blades based on the clearances of the plurality of blades by the processing subsystem.

2. The method of claim 1, wherein determining the peak voltages corresponding to the plurality of blades, comprises:

determining rotation time periods corresponding to the plurality of blades based upon the times of generation of the rotation signals;

determining discrete time starting indices corresponding to the plurality of blades based upon the rotation time periods and the times of generation of the rotation signals; and generating a time synchronous averaging waveforms by applying the time synchronous averaging technique to the discrete time starting indices, the mean rotation time periods, and the blade passing signals.

3. The method of claim 2, wherein determining a time of generation in the times of generation corresponding to a rotation signal in the rotation signals, comprises:

determining a first point and a second point on the rotation signal based upon a determined threshold;

determining a first time corresponding to the first point and a second time corresponding to the second point; and determining the time of generation based upon the first time and the second time.

4. The method of claim 3, wherein determining the first time corresponding to the first point and the second time corresponding to the second point comprises linearly interpolating the first point to the first time and linearly interpolating the second point to the second time.

5. The method of claim 3, wherein determining the times of generation based upon the first time and the second time comprises determining an average of the first time and the second time.

6. A system, comprising:

a rotation identification device that generates rotation signals corresponding to a rotor physically coupled to a plurality of blades, wherein the rotation signals represent at least one of a completion and a beginning of a single rotation of the rotor; and a processing subsystem communicatively coupled to the rotation indentification device and configured to:

determine times of generation of the rotation signals based upon the rotation signals;

determine peak voltages corresponding to the plurality of blades by applying time synchronous averaging technique to blade passing signals based on the times of generation of the rotation signals;

determine clearances of the plurality of blades based on the peak voltages, wherein the clearances are representative of a radial distance between the plurality of blades and a casing; and monitoring health of the plurality of blades based on the clearances of the plurality of blades.

7. The system of claim 6, further comprising a plurality of sensors operationally coupled to the processing subsystem, wherein the plurality of sensors generates the blade passing signals.

8. The system of claim 7, wherein the plurality of sensors comprise a capacitive sensing device.

9. The system of claim 6, wherein the rotation indentification device is a key phasor.

10. The system of claim 6, wherein the rotor comprises at least one notch.

11. The system of claim 6, wherein and the rotation identification device is mounted underneath a casing and proximate to the rotor.

* * * * *

UNITED STATES PATENT AND TRADEMARK OFFICE
CERTIFICATE OF CORRECTION

PATENT NO.       : 9,250,056 B2                                    Page 1 of 1
APPLICATION NO.  : 13/731596
DATED            : February 2, 2016
INVENTOR(S)      : D'Souza et al.

It is certified that error appears in the above-identified patent and that said Letters Patent is hereby corrected as shown below:

In the claims,

In Column 10, Line 15, in Claim 6, delete "indentification" and insert -- identification --, therefor.

In Column 10, Lines 35-36, in Claim 9, delete "indentification" and insert -- identification --, therefor.

In Column 10, Line 40, in Claim 11, delete "and the" and insert -- the --, therefor.

Signed and Sealed this
Twelfth Day of April, 2016

Michelle K. Lee
*Director of the United States Patent and Trademark Office*